United States Patent
Ball (10) Patent No.: US 7,203,799 B1
(45) Date of Patent: Apr. 10, 2007

(54) INVALIDATION OF INSTRUCTION CACHE LINE DURING RESET HANDLING

(75) Inventor: James Loran Ball, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 341 days.

(21) Appl. No.: 10/815,559

(22) Filed: Mar. 31, 2004

(51) Int. Cl.
*G06F 12/12* (2006.01)
(52) U.S. Cl. ........................ 711/125; 711/133
(58) Field of Classification Search ........... 711/129, 711/207, 125, 133; 710/260
See application file for complete search history.

(56) References Cited

U.S. PATENT DOCUMENTS

| | | | |
|---|---|---|---|
| 5,699,551 A * | 12/1997 | Taylor et al. | 711/207 |
| 5,784,625 A * | 7/1998 | Walker | 710/260 |
| 6,681,296 B2 * | 1/2004 | Liao et al. | 711/129 |
| 6,859,862 B1 * | 2/2005 | Liao et al. | 711/129 |
| 6,978,357 B1 * | 12/2005 | Hacking et al. | 711/214 |
| 2002/0062424 A1 * | 5/2002 | Liao et al. | 711/129 |

OTHER PUBLICATIONS

Bernd Paysan, "A Four Stack Processor", http://www.jwdt.com/~paysan/4stack.pdf, Apr. 25, 2000, 25 pages.

* cited by examiner

*Primary Examiner*—Pierre Bataille
*Assistant Examiner*—Paul Schlie
(74) *Attorney, Agent, or Firm*—Beyer Weaver & Thomas, LLP (57) ABSTRACT

Methods and apparatus are provided for handling events such as faults and resets. Specialized circuitry or hardware is provided within a processor to invalidate the cache line associated with the processor cache reset address. Based on the invalided state of the cache reset address line, the processor obtains new instructions from data memory. The new instructions can be configured to invalidate the remaining cache lines using software mechanisms.

28 Claims, 10 Drawing Sheets

Figure 1

| Instruction Cache 201 | |
|---|---|
| Instruction Portion 221 | Tag Portion 231 |
| Instruction Portion 223 | Tag Portion 233 |
| Instruction Portion 225 | Tag Portion 235 |
| ⋮ | |
| Instruction Portion 229 | Tag Portion 239 |
| | |

211 [ (row with Instruction Portion 221)
213 [ (row with Instruction Portion 223)
215 [ (row with Instruction Portion 225)
219 [ (row with Instruction Portion 229)

Figure 2

| Data Cache 301 | |
|---|---|
| Data Portion 321 | Tag Portion 331 |
| Data Portion 323 | Tag Portion 333 |
| Data Portion 325 | Tag Portion 335 |
| ⋮ | |
| Data Portion 329 | Tag Portion 339 |
| | |

311 [ (Data Portion 321 / Tag Portion 331)
313 [ (Data Portion 323 / Tag Portion 333)
315 [ (Data Portion 325 / Tag Portion 335)
319 [ (Data Portion 329 / Tag Portion 339)

INVALIDATION OF INSTRUCTION CACHE LINE DURING RESET HANDLING

BACKGROUND OF THE INVENTION

1. Field of the Invention

The present invention relates to processors. In one example, the present invention relates to methods and apparatus for processors handling and event such as a fault or reset event.

2. Description of Related Art

Conventional computer systems have processors coupled to system memory. In order to optimize access to data in system memory, individual processors are typically designed to work with cache memory. In one example, each processor has a cache that is loaded with frequently or immediately used instructions and data. Some processors have more than one level of cache. Each cache block can be read or written by the processor.

A processor cache typically includes both instruction cache and data cache. An instruction cache includes operation codes (opcodes) and parameters identifying the operations a processor should perform. Data cache typically includes data values associated with the operations. In some instances, data cache and instruction cache are integrated into a single cache block.

A processor cache also includes state information indicating the state of individual processor cache lines. A processor cache line may be shared, modified, exclusive, owned, or invalid. In some instances, a processor may only be able to distinguish between valid and invalid cache lines. The state information allows a processor to determine when information in cache is stale and a new memory access is needed to obtain new data or instructions.

However, there are some circumstances when the state or data assocaited with each cache line may be inaccurate. For example, a hardware or software fault or a reset event may cause inaccuracies in cache memory. Any event such as a fault or manual reset is referred to herein as a reset event.

Consequently, it is desirable to provide improved methods and apparatus for handling faults and reset events to prevent inaccuracies in processor cache memory.

SUMMARY OF THE INVENTION

Methods and apparatus are provided for handling events such as faults and resets. Specialized circuitry or hardware is provided within a processor to invalidate the cache line associated with the processor cache reset address. Based on the invalided state of the cache reset address line, the processor obtains new instructions from data memory. The new instructions can be configured to invalidate the remaining cache lines using software mechanisms.

In one embodiment, a processor is provided. The processor includes a multiple registers, processing circuitry, and an instruction cache. The processing circuitry is associated with the registers. The instruction cache is coupled to the processing circuitry. The instruction cache is configured to provide copies of instructions in memory to the processing circuitry. A reset address line associated with the instruction cache is invalidated using reset address line invalidate circuitry upon reset.

In another embodiment, a programmable chip system is provided. The programmable chip system includes processing circuitry and multiple components. Processing circuitry is associated with multiple registers. The processing circuitry is operable to execute instructions included in a supported instruction set. The processing circuitry is associated with reset address line invalidate circuitry operable to invalidate a line in processor cache. The components are coupled to the processing circuitry through an interconnection module.

In another embodiment, a method for performing a reset is provided. A reset event is identified at a processor. A reset address line associated with a processor cache is invalidated. Multiple instructions are obtained from memory. The multiple instructions are obtained after a read access request for the reset address line. A sequence of instructions are executed to invalidate a plurality of lines associated with the processor cache.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processors and memory.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Conventional processors are configured with one or more levels of cache memory. Cache memory typically includes both an instruction cache and a data cache. Cache memory is used to store instructions or data that a processor is expected to access. Data cache is used to store data values frequently accessed by a processor. Under normal operation, a cache allows more efficient access to instructions and data values. However, a variety of faults and events can cause and instruction cache to become unreliable.

For example, hardware faults, software errors, electrical noise, and/or other phenomena can cause the contents of a cache to become corrupted. Consequently, when a processor recovers from a fault using an operation such as a reset, a cache is often unreliable. Conventional processors include mechanisms for enabling or disabling the cache. In many instances, and instruction cache and a data cache have the ability to be completely enabled or disabled by software. When a processor recovers from a fault, the processor bypasses the cache and accesses data and instructions directly from memory. This allows a processor to bypass potentially stale instructions and data in the processor cache.

Providing a mechanism to bypass the processor cache uses extra hardware resources. In general-purpose processors or custom application-specific integrated circuits (ASICs), the extra hardware resources used can be efficiently implemented, although the techniques of the present invention can still be applied to allow for other benefits. In programmable chips, the extra hardware resources needed to bypass the cache are not trivial. Mechanisms such as multiplexers used for bypass circuitry on a programmable chip are relatively expensive. Consequently, the techniques of the present invention provide an instruction and a data cache implementation where the cache is always enabled. By leaving the cache enabled, the need for extra hardware resources to support a conventional instruction cache or data cache is removed.

Furthermore, providing a bypass between processing circuitry and a cache introduces delay. Typically, the delay is minimal. However, delay is introduced during every cache access request. Having delay added to every cache access request simply to allow handling of a possibly infrequent reset event is highly inefficient. Consequently, the techniques of the present invention allow reset handling without bypass circuitry.

According to various embodiments, the techniques of the present invention provide a processor with specialized circuitry or hardware to invalidate the reset address line associated with an instruction cache. The techniques of the present invention recognize that providing specialized circuitry or hardware to invalidate all lines in both an instruction and a data cache would be substantial, particularly since a reset is a relatively uncommon event. Consequently, mechanisms are provided for using hardware to invalidate a reset address line and instruction cache while allowing software routine to invalidate the other lines in both the instruction and data cache.

Since the instruction cache remains enabled, a processor will attempt to access a cache to obtain instructions. Upon accessing the cache line, the processor recognizes that the cache line is invalid and will perform a read access to memory to obtain a valid instruction. The memory location can initiate a software routine to invalidate all of the lines in the instruction cache, although lines in the data cache can be invalidated as well. With all of the lines invalidated, the processor will then begin obtaining new instructions and new data from memory to bring the cache back to a non-corrupted and/or non-empty state.

Figure 1:
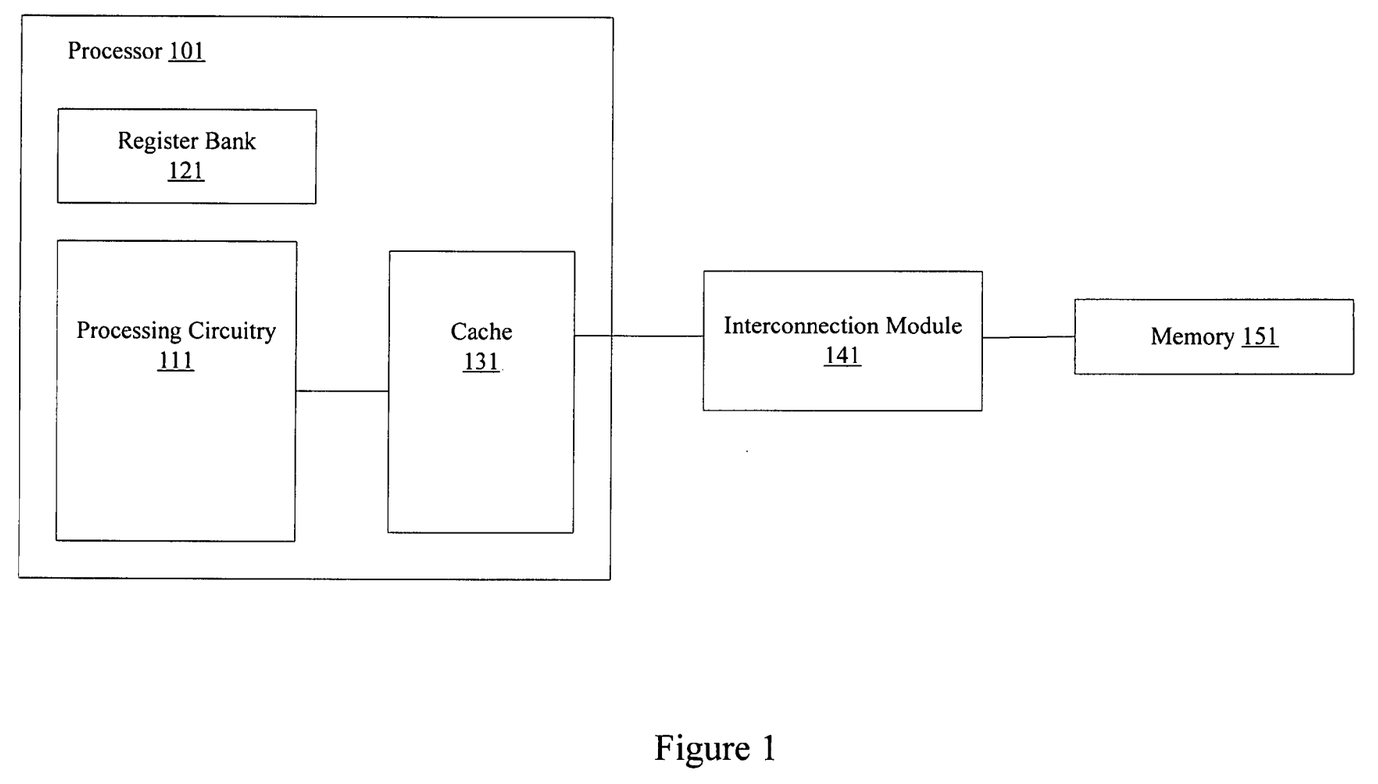
FIG. 1 is a diagrammatic representation showing a processor coupled to memory.

FIG. 1 is a diagrammatic representation showing a processor. The processor 101 includes a register bank 121, processing circuitry 111, and a cache 131. According to various embodiments, register bank 121 includes multiple registers holding information most frequently accessed by the processing circuitry 111. Processing circuitry 111 includes circuitry for performing various instructions supported in a processor or instruction set. According to various embodiments, the processing circuitry 111 obtains instructions and data values from a cache 131. In some examples, a processor 101 includes multiple levels of cache 131. The processor 101 is coupled to memory 151 such as system memory through an interconnection module 141. In some examples, the interconnection module 141 is a bus. In other examples, the interconnection module 141 is an interconnection fabric described below. The interconnection module 141 allows a processor 101 to obtain data and instructions from memory 151 when data and instructions are no longer valid in the cache 131.

The cache 131 typically includes a portion for holding instructions and a portion for holding data. Any portion of cache used to hold instructions for processing circuitry is referred to herein as an instruction cache. Any portion used primarily to hold data values is referred to herein as a data cache.

Figure 2:
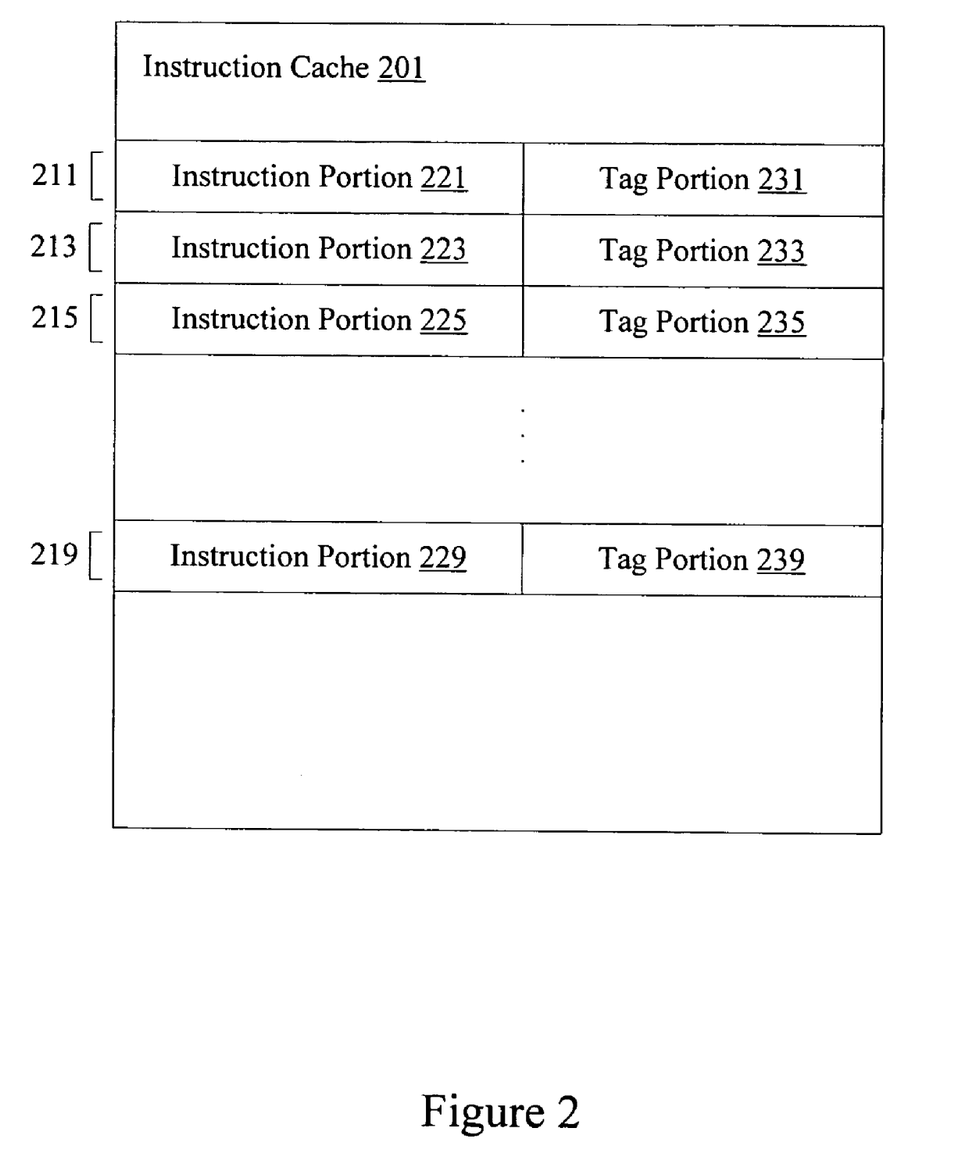
FIG. 2 is a diagrammatic representation showing an instruction cache.

FIG. 2 is a diagrammatic representation showing an instruction cache. An instruction cache 201 includes multiple lines for holding instructions. According to various embodiments, each instruction cache line is large enough to accommodate multiple instructions. In one example, and instruction cache 201 has lines 211, 213, 215, and 219 each holding multiple instructions. Each instruction cache line has an instruction portion and a tap portion. Any portion of an individual cache line used to hold one or more instructions is referred to herein as an instruction portion. Any portion of an individual cache line used to hold state information associated with the cache line is referred to herein as a tag portion. In one example, instruction portions 221, 223, 225, and 229 each hold multiple instructions. In one instance, an instruction portion 221 holds four instructions with their assocaited operation codes (opcodes). A tag portion 231 indicates the state of the instruction cache line 211. A tag portion 231 can hold state information such as an invalid or valid state variable. In other examples, the tag portion 231 holds state information such as shared, exclusive, owned, or modified using several bits.

Typically, upon receiving an event such as a reset or a fault event, an instruction cache 201 is bypassed because the contents of the instruction cache may be corrupt. New instructions are loaded into instruction cache to provide valid instructions to processing circuitry. According to various embodiments, an instruction cache 201 includes a reset address line. Any line in cache read initially by a processor upon reset is referred to herein as a reset address line.

Figure 3:
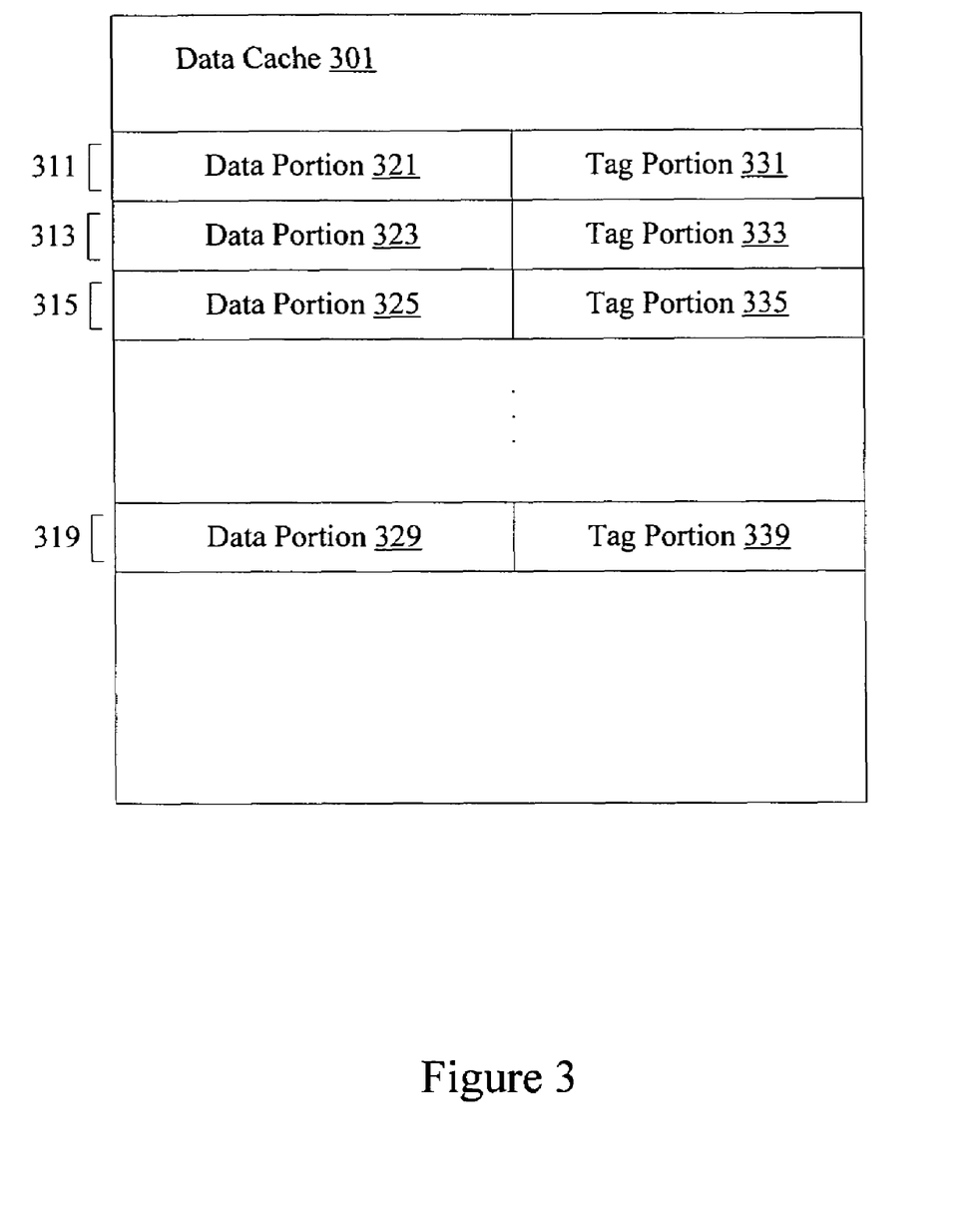
FIG. 3 is a diagrammatic representation showing a data cache.

FIG. 3 is a diagrammatic representation showing a data cache. The data cache 301 includes data cache lines 311, 313, 315, and 319. Each data cache line includes one or more data values in the data portion and state information in the tag portion. In one example, data cache line 311 includes multiple data values in data portion 321 and an invalid tag in portion 331. Any portion of an individual data cache line used to hold data such as parameters for various instructions is referred to herein as a data portion. Any portion of a data cache line used to hold state information associated with the data in a data cache line is referred to herein as the tag portion.

Figure 4:
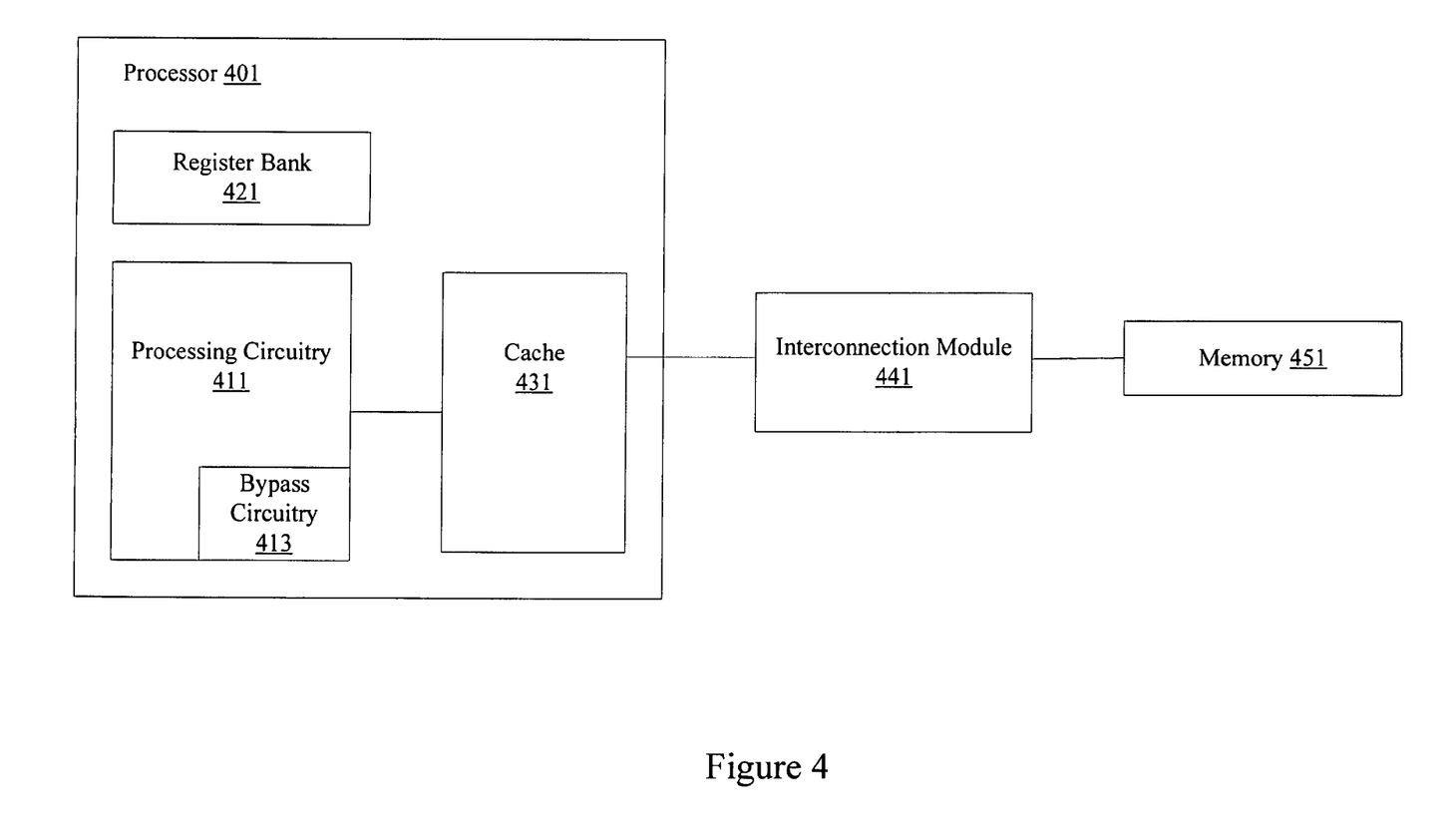
FIG. 4 is a diagrammatic representation showing one possible bypass mechanism.

FIG. 4 is a diagrammatic representation showing a processor with bypass circuitry. Any mechanism allowing a processor to access memory without going through cache is referred to herein as bypass circuitry. Any mechanism used during reset to allow a processor to bypass cache is referred to herein as a reset bypass circuitry. According to various embodiments, a processor 401 includes a register bank 421, processing circuitry 411, and a cache 431. Bypass circuitry 413 can be included in cache 431 itself, in processing circuitry 411, or elsewhere. The bypass circuitry 413 allows processing circuitry 411 to directly access memory 451 without having to access cache lines. In some examples, bypass circuitry 413 is implemented using control logic and multiplexers. A processor using bypass circuitry is expensive to implement particularly on programmable chips. Bypass circuitry also introduces delay into the processor data path. Although the delay may be minor, the delay becomes cumulatively substantial when every cache access request is affected. According to various embodiments, processing circuitry 411 is also delayed by bypass circuitry 413 when memory 451 is accessed through interconnection module 441.

Consequently, bypass circuitry can be inefficient in both implementation and instruction processing. That is, bypass circuitry may both take a lot of resources and to implement and delay processing of various instructions supported by a processor. Consequently, techniques and mechanism to the present invention contemplate allowing a processor to handle faults and reset events and without using bypass circuitry.

Figure 5:
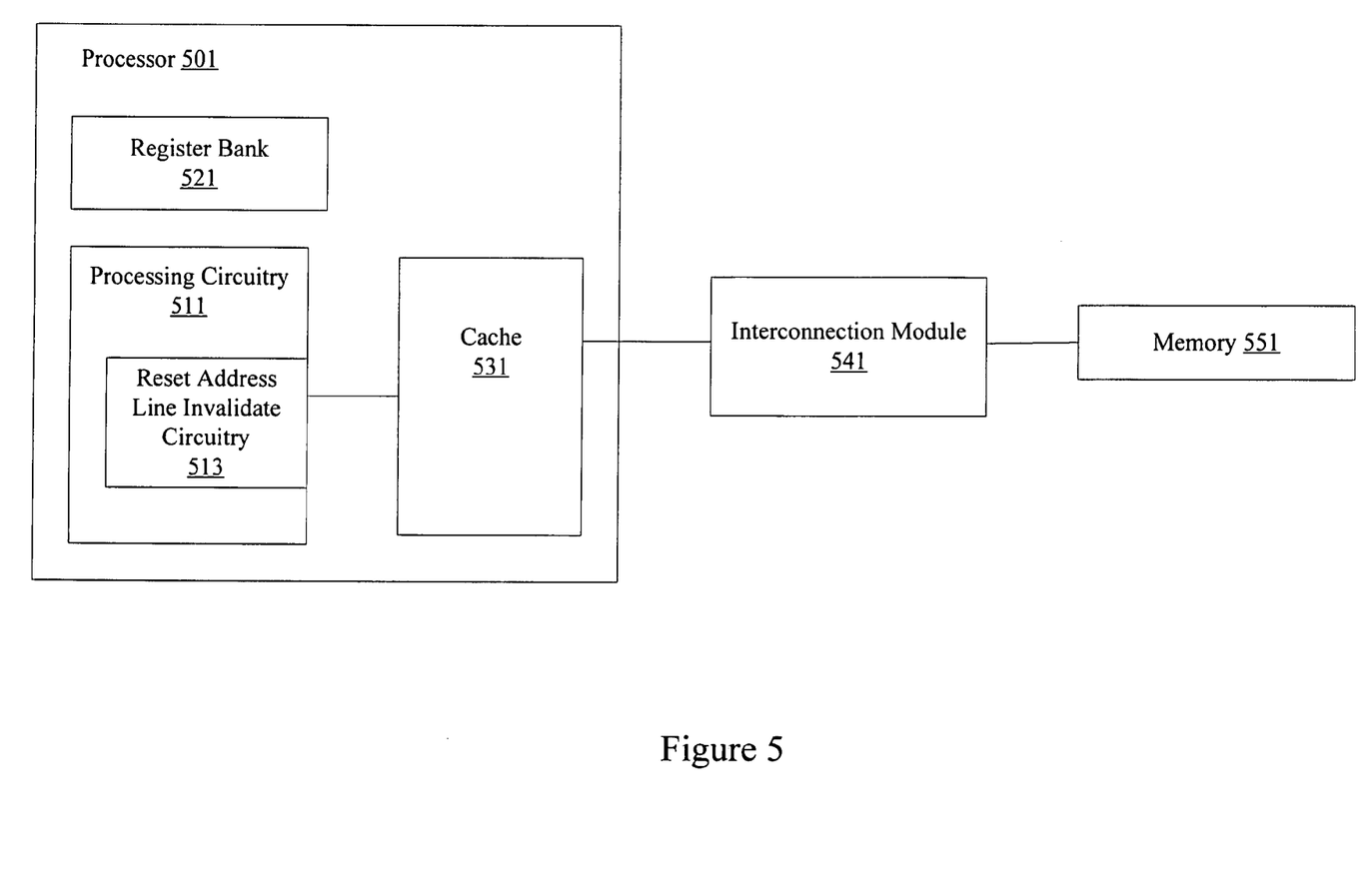
FIG. 5 is a diagrammatic representation showing subcircuitry dedicated to invalidating a single instruction cache line.

FIG. 5 is a diagrammatic representation showing a processor without bypass circuitry. A processor 501 includes a register bank 521. The register bank 521 typically includes multiple registers. The processor 501 also includes processing circuitry 511 and a cache 531. The cache 531 can include both an instruction cache and a data cache. According to various embodiments, processing circuitry 511 includes reset address line invalidate circuitry. It should be noted that reset address line invalidate circuitry can also be included as a component of cache 531. In one example, the reset address line invalidate circuitry automatically invalidates a cache line upon reset. According to various embodiments, an instruction line or reset address line initially read in cache is invalidated.

In some examples, it may be possible to specially configure circuitry to invalidate all the lines of a cache 531 including all instruction cache lines and all data cache lines. However, providing such specialized circuitry can be resource intensive, particularly for programmable chips. Consequently, the techniques of the present invention envision providing specialized circuitry to invalidate a limited number of lines and instruction cache 531. In one example, a single line including several instructions is invalidated.

The several instructions are then used to initiate a software routine to invalidate the remaining lines in the cache 531. In one example, the software routine invalidates only the instruction cache lines. In another example, lines including both instruction cache lines in data cache lines are invalidated. Any logic or mechanism used to invalidate a reset address line is referred to herein as reset address line invalidate circuitry.

Figure 6:
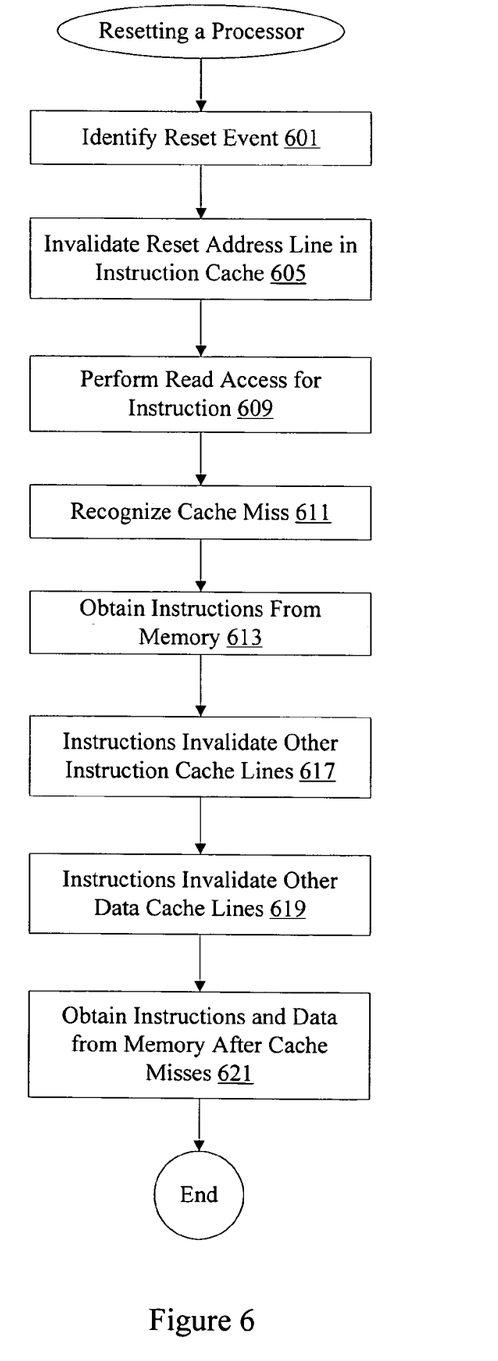
FIG. 6 is a flow process diagram showing a technique for resetting a processor.

FIG. 6 is a flow process diagram showing a technique for resetting a processor. Any mechanism for executing a reset is referred to herein as a reset handler. At 601, a reset event is identified. The reset event may be the result of a software error that leaves a cache in a corrupted state. In typical instances, a new version of software is loaded into memory after a reset sequence is complete. The techniques of the present invention allow a new version of software to be loaded without using bypass circuitry. The techniques of the present invention provide a reset handler that empties the instruction cache to remove the stale instructions and data in cache and allow new software to be executed. The reset event may also be the result of a hardware fault. A reset after a hardware fault is used to reinitialize a processor to a known initial state. A hardware fault may have caused the contents of an instruction cache to be corrupted. The reset handler of the present invention removes any potentially corrupted data instructions so that they can be fetched from memory upon reset. In another example, a reset may simply occur after a power up. The contents of an instruction cache may be random or empty on power up. Consequently, a reset handler of the present invention is used to initialize a processor into a known state.

A variety of faults and reset events may be detected. At 605, specialized circuitry associated with a processor is used to invalidate the reset address line in the instruction cache. According to various embodiments, a single line in instruction cache is invalidated. However, it should be recognized that multiple lines can also be invalidated using specialized circuitry. At 609, a processor performs a read access for the instruction. At 611, processor recognizes the cache miss based on the invalid state of the reset address line. Because of the invalid state, the processor obtains instructions from memory at 613. According to various embodiments, the instructions are obtained from memory to initialize a software routine that invalidates other instruction cache lines at 617. At 618, the software subroutine invalidates data cache lines. At 621, instructions and data are obtained from memory after cache misses based on the invalid state of the various instruction cache and data cache lines. A reset handler effectively allows a processor to return to a known state.

Although the techniques and mechanisms of the present invention are applicable to a variety of different processors including general purpose processors, video accelerators, cryptography accelerators, digital signal processors, microcontrollers, etc., the techniques and mechanisms of the present invention are particularly applicable to soft core processors on programmable chips and programmable chip systems. Logic is often at a premium on programmable chips, so the reduction in core sizes using the reset address line invalidate mechanism is often particularly beneficial.

Figure 7:
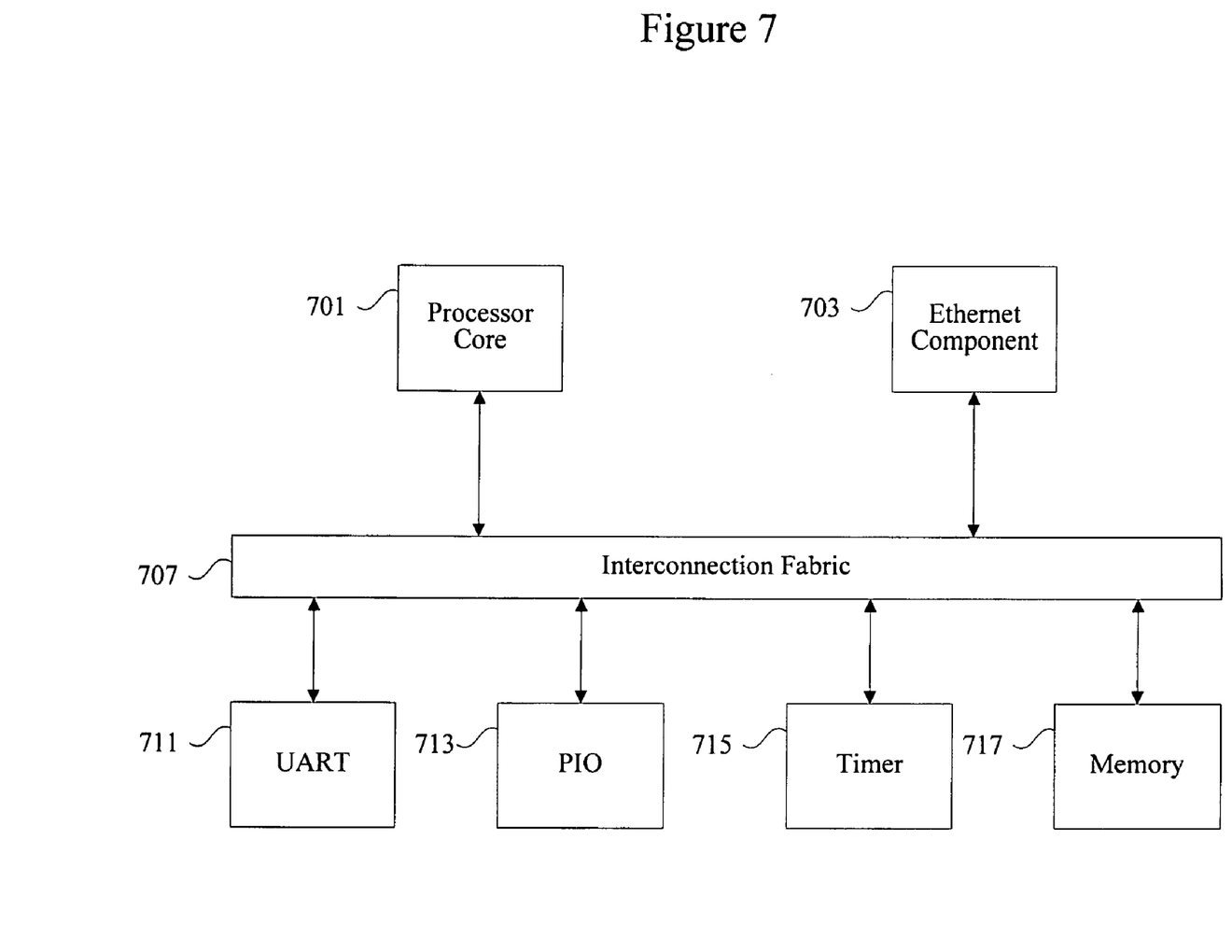
FIG. 7 is a diagrammatic representation showing a programmable chip.

FIG. 7 is a diagrammatic representation showing one example of a system on a programmable chip that can be used to implement the techniques of the present invention. The system includes a processor core, a hardware accelerator, peripheral devices, and peripheral interfaces. The processor core size can be optimized by reusing subcircuitry to perform both branch and non-branch operations. Peripheral devices and peripheral interfaces are herein referred to as components. The system on a programmable chip includes processor core 701 and an Ethernet component 703 as well as peripheral components UART 711, PIO 713, timer 715, and data memory 717. In some examples, the Ethernet component 103 is instead a Digital Signal Processing (DSP) core, a cryptography accelerator, or a video processor. It should be noted that the system can include both on-chip memory 717 and off-chip memory. In one example, the data memory 717 can support variable latency or fixed latency access. The components are interconnected using an interconnection fabric 707. Any mechanism or logic for connecting components in a system is referred to herein as an interconnection fabric. In one example, the interconnection fabric is a bus. In another example, the interconnection fabric is a secondary side arbitration fabric.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

The techniques and mechanisms of the present invention allow the implementation of a system on a programmable chip from a high-level language program. In one example, variable latency and fixed latency can be supported on a system using a conventional bus architecture.

A system bus typically has a set width (e.g. 64 bits, 128 bits) and allows only one primary component to actively use the bus at any one time. In conventional systems, only one primary component can access any one of the given secondary components at any given time. Multiple primary components accessing secondary components in a manner that would cause data bit collisions if performed on the same data lines is referred to herein as accessing secondary components at the same time.

In one example, an Ethernet component is accessing a secondary PIO. While the Ethernet component is accessing the secondary PIO, a processor can not access an SDRAM through a peripheral interface even if both the primary streaming output device and the peripheral interface are available.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip or a programmable device. Instead of implementing complicated bus sharing schemes using mechanisms such as splitting, the bus itself can be eliminated to improve system performance.

According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed. Furthermore, by not using a bus, interconnection flexibility is enhanced. For example, an Ethernet component can be allocated a variety of ports for directly accessing a memory and the only resource in contention would be the memory.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. The techniques of the present invention recognize that Ethernet component support for high-level language programs can be more efficiently and effectively provided in a system by using secondary side arbitration.

Figure 8:
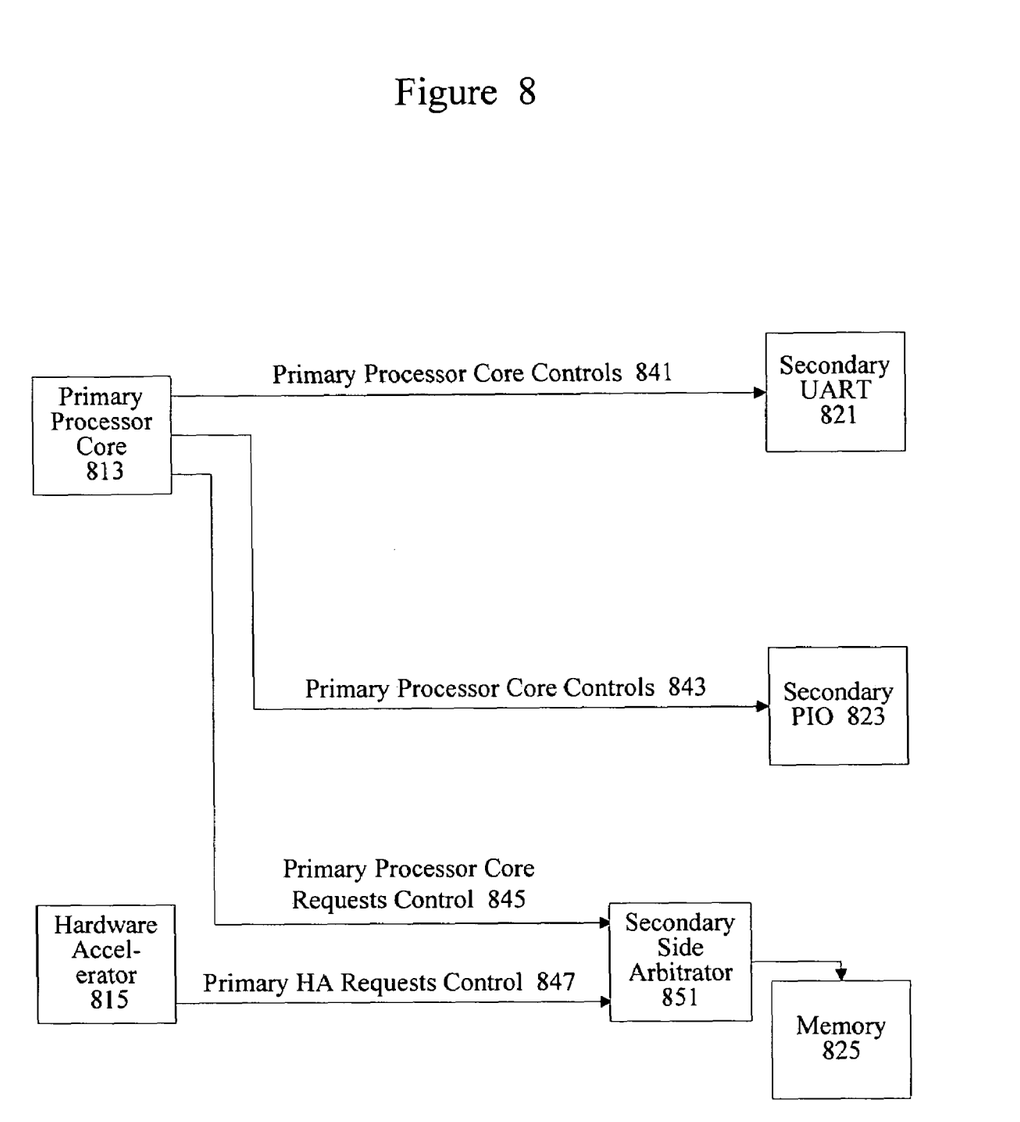
FIG. 8 is a diagrammatic representation showing an interconnection fabric.

FIG. 8 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments, a secondary component such as peripheral interface 825 is associated with a secondary side arbitrator 851. However, secondary components UART 821 and PIO 823 are not associated with any arbitrator. In one example, secondary component UART 821 and secondary PIO 823 can only be accessed by primary CPU 813 and not by primary Ethernet device 815. A secondary memory component 825, however, can be accessed by both primary CPU 813 and primary Ethernet device 815.

According to various embodiments, a secondary side arbitrator 851 allows a first secondary component in a system to be accessed by a first primary component at the same time a second secondary component in the system is accessed by a second primary component. For example, peripheral interface 825 can be accessed by primary Ethernet 815 through secondary side arbitrator 851 at the same time, secondary UART 821 is accessed by primary CPU 813.

By allowing a CPU to access a secondary component at the same time another primary component such as a streaming output device or an Ethernet component is accessing memory, bus bottlenecks can be reduced. By using the simultaneous multiple primary component architecture, more direct connections between components can also be supported.

Figure 9:
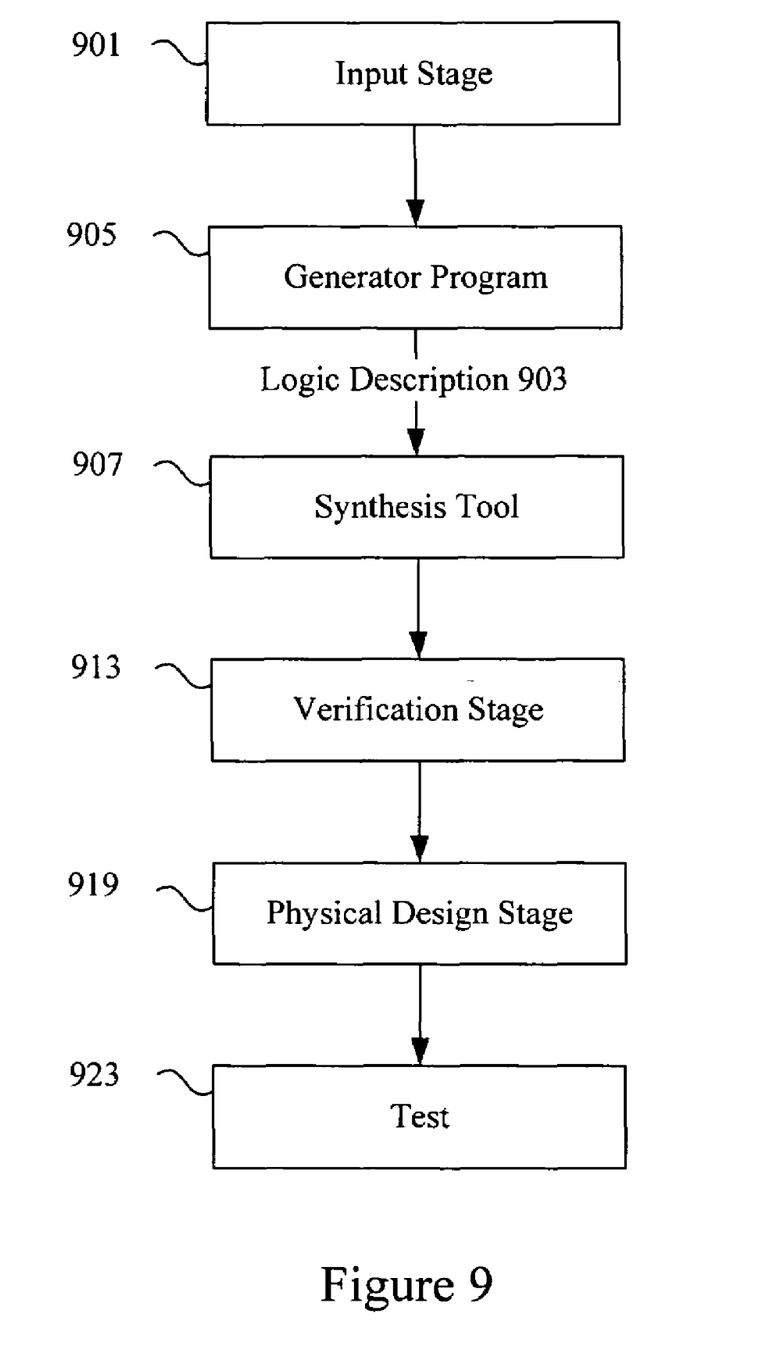
FIG. 9 is a diagrammatic representation showing a technique for implementing the programmable chip.

FIG. 9 is a diagrammatic representation showing implementation of a system on a programmable chip. An input stage 901 receives selection information typically from a user for logic such as a processor core as well as other components such as a streaming output device to be implemented on an electronic device. In one example, the input received is in the form of a high-level language program. A generator program 905 creates a logic description and provides the logic description along with other customized logic to any of a variety of synthesis tools, place and route programs, and logic configuration tools to allow a logic description to be implemented on an electronic device.

In one example, an input stage 901 often allows selection and parameterization of components to be used on an electronic device. The input stage 901 also allows configuration of variable or fixed latency support. In some examples, components provided to an input stage include intellectual property functions, megafunctions, and intellectual property cores. The input stage 901 may be a graphical user interface using wizards for allowing efficient or convenient entry of information. The input stage may also be a text interface or a program reading a data file such as a spreadsheet, database table, or schematic to acquire selection information. The input stage 901 produces an output containing information about the various modules selected.

In typical implementations, the generator program 905 can identify the selections and generate a logic description with information for implementing the various modules. The generator program 905 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 905 identifies pointers and provides ports for each pointer. One tool with generator program capabilities in System on a Programmable Chip (SOPC) Builder available from Altera Corporation of San Jose, Calif. The generator program 905 also provides information to a synthesis tool 907 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 909.

As will be appreciated by one of skill in the art, the input stage 901, generator program 905, and synthesis tool 907 can be separate programs. The interface between the separate programs can be a database file, a log, or simply messages transmitted between the programs. For example, instead of writing a file to storage, the input stage 901 can send massages directly to the generator program 905 to allow the generator program to create a logic description. Similarly, the generator program can provide information directly to the synthesis tool instead of writing HDL files. Similarly, input stage 901, generator program 905, and synthesis tool 907 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 907.

A synthesis tool 907 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 913 typically follows the synthesis stage 907. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 913, the synthesized netlist file can be provided to physical design tools 919 including place and route and configuration tools. A place and route tool typically locates logic cells on specific logic elements of a target hardware device and connects wires between the inputs and outputs of the various logic elements in accordance with logic required to implement an electronic design. The device can also be physically tested at 923.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 901, the generator program 905, the synthesis tool 907, the verification tools 913, and physical design tools 919 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 10:
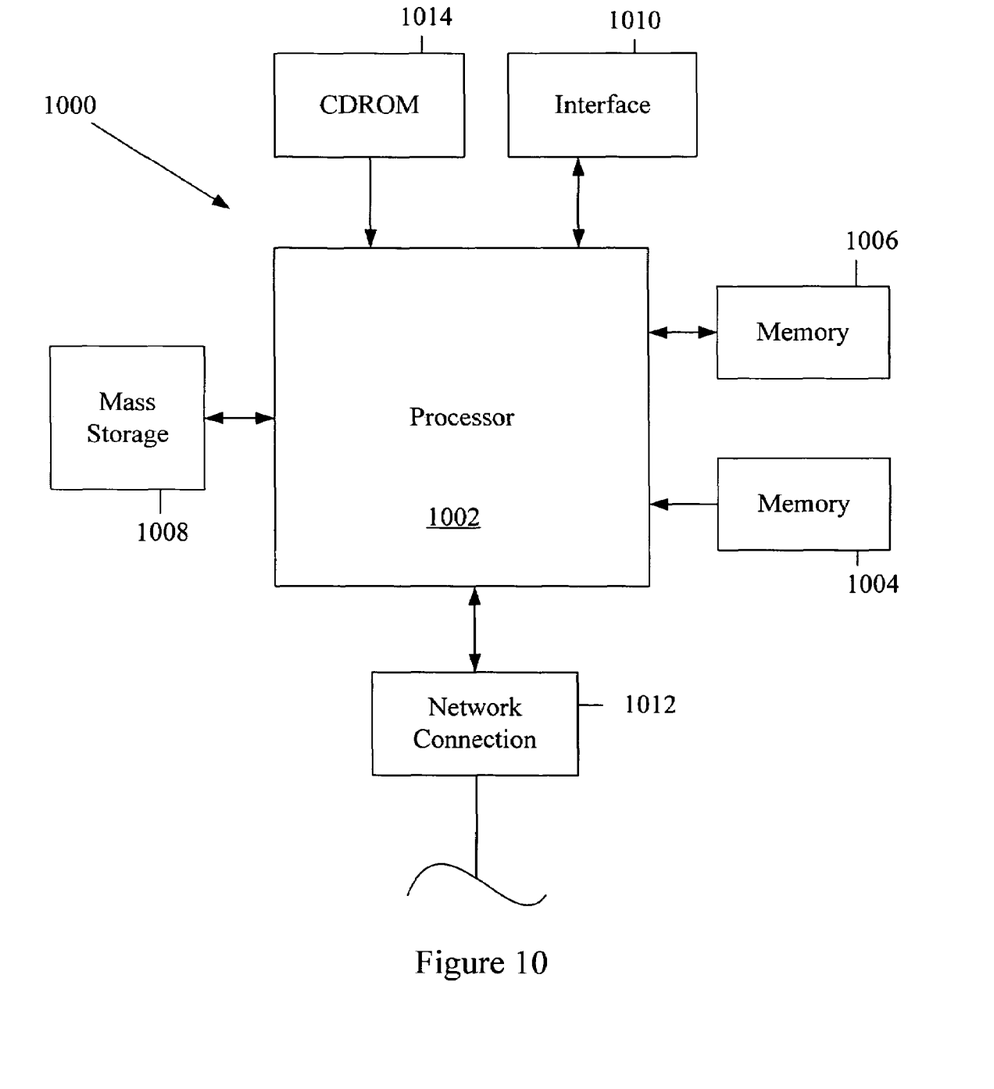
FIG. 10 is a diagrammatic representation depicting a computer system.

FIG. 10 illustrates a typical computer system that can be used to implement a programmable chip having shared I/O lines. The computer system 1000 includes any number of processors 1002 (also referred to as central processing units, or CPUs) that are coupled to devices including memory 1006 (typically a random access memory, or "RAM"), memory 1004 (typically a read only memory, or "ROM"). The processors 1002 can be configured to generate a test sequences for any designated processor. As is well known in the art, memory 1004 acts to transfer data and instructions uni-directionally to the CPU and memory 1006 is used typically to transfer data and instructions in a bi-directional manner.

Both of these memory devices may include any suitable type of the computer-readable media described above. A mass storage device 1008 is also coupled bi-directionally to CPU 1002 and provides additional data storage capacity and may include any of the computer-readable media described above. The mass storage device 1008 may be used to store programs, data and the like and is typically a secondary storage medium such as a hard disk that is slower than memory. The mass storage device 1008 can be used to hold a library or database of prepackaged logic or intellectual property functions, as well as information on generating particular configurations. It will be appreciated that the information retained within the mass storage device 1008, may, in appropriate cases, be incorporated in standard fashion as part of memory 1006 as virtual memory. A specific mass storage device such as a CD-ROM 1014 may also pass data uni-directionally to the CPU.

CPU 1002 is also coupled to an interface 1010 that includes one or more input/output devices such as such as video monitors, track balls, mice, keyboards, microphones, touch-sensitive displays, transducer card readers, magnetic or paper tape recorders, tablets, styluses, voice or handwriting recognizers, or other well-known input devices such as, of course, other computers. Finally, CPU 1002 optionally may be coupled to a computer or telecommunications network using a network connection as shown generally at 1012. With such a network connection, it is contemplated that the CPU might receive information from the network, or might output information to the network in the course of performing the above-described method steps. It should be noted that the system 1000 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 1008 or 1014 and executed on CPU 1008 in conjunction with primary memory 1006.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. It is therefore intended that the invention be interpreted to include all variations and equivalents that fall within the true spirit and scope of the present invention.

What is claimed is:

1. A processor, comprising:
a plurality of registers;
processing circuitry associated with the plurality of registers, wherein the processing circuitry is operable to execute instructions included in a supported instruction set;
an instruction cache coupled to the processing circuitry, wherein the instruction cache is configured to provide copies of instructions in memory to the processing circuitry, the instruction cache including a first subset of instruction cache lines and a second subset of instruction cache lines, the second subset of instruction cache lines including one or more cache lines not included in the first subset;
wherein the first subset of instruction cache lines is invalidated using reset address line invalidate circuitry upon reset without using bypass circuitry, the first subset of instruction cache lines corresponding to instructions in memory used to invalidate the second subset of instruction cache lines.

2. The processor of claim 1, wherein reset address line invalidate circuitry invalidates a single line in instruction cache upon reset.

3. The processor of claim 1, wherein each line in the instruction cache comprises a tag portion and an instruction portion.

4. The processor of claim 3, wherein the tag portion includes the state of an instruction cache line.

5. The processor of claim 3, wherein the processor further comprises a data cache.

6. The processor of claim 5, wherein instructions copied comprise instructions for invalidating the second subset of instruction cache lines.

7. The processor of claim 5, wherein instructions copied comprise instructions for invalidating all lines in the data cache.

8. The processor of claim 1, wherein the processor is a processor core on a programmable chip.

9. The processor of claim 8, wherein the processor is coupled to memory through a simultaneous multiple primary component fabric.

10. The processor of claim 8, wherein the processor can have its instruction cache invalidated and its data cache invalidated upon reset without the use of bypass circuitry.

11. A programmable chip system, comprising:
processing circuitry associated with a plurality of registers, wherein the processing circuitry is operable to execute instructions included in a supported instruction set, the processing circuitry associated with reset address line invalidate circuitry operable to invalidate a first subset of cache lines upon reset without bypass circuitry, the first subset of cache lines corresponding to instructions in memory used to invalidate a second subset of cache lines, the second subset of instruction cache lines including one or more cache lines not included in the first subset;
a plurality of components coupled to the processing circuitry through an interconnection module.

12. The programmable chip system of claim 11, wherein reset address line invalidate circuitry invalidates a single line in instruction cache upon reset.

13. The programmable chip system of claim 11, wherein each line in the instruction cache comprises a tag portion and an instruction portion.

14. The programmable chip system of claim 13, wherein invalidating the first subset of instruction cache lines associated with the instruction cache comprises setting the tag portion of the first subset of instruction cache lines to invalid.

15. The programmable chip system of claim 14, wherein instructions from memory are copied into the instruction cache at the reset address line upon identifying that the first subset of instruction cache lines have been invalidated.

16. The programmable chip system of claim 15, wherein the tag portion includes the state of an instruction cache line.

17. The programmable chip system of claim 15, wherein the programmable chip system further comprises a data cache.

18. The programmable chip system of claim 17, wherein instructions copied comprise instructions for invalidating the second subset of cache lines.

19. The programmable chip system of claim 17, wherein instructions copied comprise instructions for invalidating all lines in the data cache.

20. The programmable chip system of claim 11, wherein the interconnection module is a simultaneous multiple primary component fabric.

21. The programmable chip system of claim 20, wherein the processor can have its instruction cache invalidated upon reset without the use of bypass circuitry.

22. A method for performing a reset, the method comprising:
identifying a reset event at a processor;
invalidating a first subset of cache lines associated with processor cache without the use of bypass circuitry upon identifying the reset event, the first subset of cache lines corresponding to a plurality of instructions in memory used to invalidate a second subset of cache lines, the second subset of instruction cache lines including one or more cache lines not included in the first subset;
obtaining the plurality of instructions from memory, the plurality of instructions obtained after a read access request for the first subset of cache lines;
executing the plurality of instructions to invalidate a plurality of lines associated with the processor cache.

23. The method of claim 22, wherein the first subset of cache lines is associated with a processor instruction cache.

24. The method of claim 22, wherein the plurality of instructions invalidates substantially all of the lines associated with processor cache.

25. The method of claim 1, wherein reset events are associated with hardware faults and software faults.

26. A processor, comprising:
means for identifying a reset event;
means for invalidating a first subset of cache lines assocaited with processor cache without the use of bypass circuitry upon identifying the reset event, the first subset of cache lines corresponding to a plurality of instructions in memory used to invalidate a second subset of cache lines, the second subset of instruction cache lines including one or more cache lines not included in the first subset;
means for obtaining the plurality of instructions from memory, the plurality of instructions obtained after a read access request for the first subset of cache lines;
means for executing the plurality of instructions to invalidate a plurality of lines assocaited with the processor cache.

27. The processor of claim 26, wherein the first subset of cache lines are associated with a processor instruction cache.

28. The processor of claim 26, wherein the plurality of instructions invalidates substantially all of the lines associated with processor cache.

* * * * *